(12) United States Patent
Riedel

(10) Patent No.: US 9,832,512 B2
(45) Date of Patent: Nov. 28, 2017

(54) DISPLAY DEVICE FOR A VEHICLE

(71) Applicant: Airbus Operations GmbH, Hamburg (DE)

(72) Inventor: Christian Riedel, Hamburg (DE)

(73) Assignee: Airbus Operations GmbH (DE)

( * ) Notice: Subject to any disclaimer, the term of this patent is extended or adjusted under 35 U.S.C. 154(b) by 148 days.

(21) Appl. No.: 14/598,446

(22) Filed: Jan. 16, 2015

(65) Prior Publication Data

US 2015/0215664 A1 Jul. 30, 2015

(30) Foreign Application Priority Data

Jan. 27, 2014 (EP) .................................. 14152742

(51) Int. Cl.
| | |
|---|---|
| *G06F 1/16* | (2006.01) |
| *H04N 5/65* | (2006.01) |
| *H04N 21/422* | (2011.01) |
| *B64D 47/02* | (2006.01) |
| *H04N 5/655* | (2006.01) |
| *H04N 21/414* | (2011.01) |
| *B64D 11/00* | (2006.01) |

(52) U.S. Cl.
CPC ....... *H04N 21/42213* (2013.01); *B64D 47/02* (2013.01); *G06F 1/1601* (2013.01); *H04N 5/655* (2013.01); *H04N 21/41422* (2013.01); *B64D 11/0015* (2013.01); *G06F 1/1632* (2013.01); *G06F 2200/1631* (2013.01)

(58) Field of Classification Search
None
See application file for complete search history.

(56) References Cited

U.S. PATENT DOCUMENTS

| | | | | |
|---|---|---|---|---|
| 2004/0184588 A1* | 9/2004 | Yueh | ..................... | G06F 1/1601 379/100.15 |
| 2006/0028791 A1* | 2/2006 | Huang | .................. | G06F 1/1601 361/679.08 |
| 2010/0120468 A1* | 5/2010 | Moran | .................. | H04M 1/725 455/556.1 |

(Continued)

OTHER PUBLICATIONS

European Search Report dated Jul. 10, 2014 (EP 14152742.4).

*Primary Examiner* — Reza Aghevli
(74) *Attorney, Agent, or Firm* — Lerner, David, Littenberg, Krumholz & Mentlik, LLP

(57) ABSTRACT

A display device for a vehicle includes a housing, a display screen, and at least one functional unit, including an operating element, each being a switch unit or a communication unit, adapted to be releasably coupled to the housing and includes an insertion portion and an operating element support portion supporting the respective operating element, and a first contact arrangement provided on the insertion portion and electrically coupled to the operating element. The housing includes at least one functional unit coupling arrangement, each adapted to be selectively and releasably coupled to at least one of the at least one functional unit and including a cavity inside the housing for receiving the insertion portion of the at least one functional unit, a second contact arrangement in the cavity, a retaining means, and an opening in an exterior wall of the housing communicating the cavity with the exterior of the housing.

15 Claims, 2 Drawing Sheets

(56) References Cited

U.S. PATENT DOCUMENTS

| | | | |
|---|---|---|---|
| 2011/0317448 A1* | 12/2011 | Podd | B60Q 1/2673 |
| | | | 362/628 |
| 2012/0162263 A1* | 6/2012 | Griffin | G06F 1/1624 |
| | | | 345/652 |
| 2013/0169541 A1* | 7/2013 | Cabos | B64D 43/00 |
| | | | 345/168 |
| 2013/0219294 A1* | 8/2013 | Goldman-Shenhar | G06F 3/0484 |
| | | | 715/751 |
| 2013/0335929 A1* | 12/2013 | Cavallaro | G06F 1/1652 |
| | | | 361/749 |

* cited by examiner

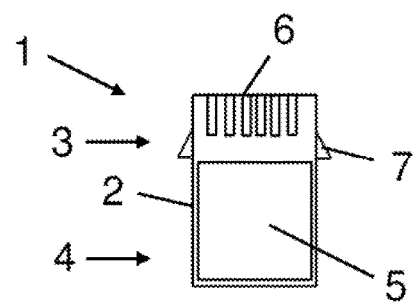
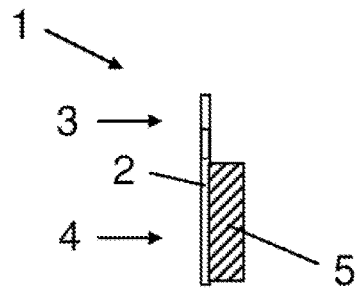
Fig. 1a    Fig. 1b
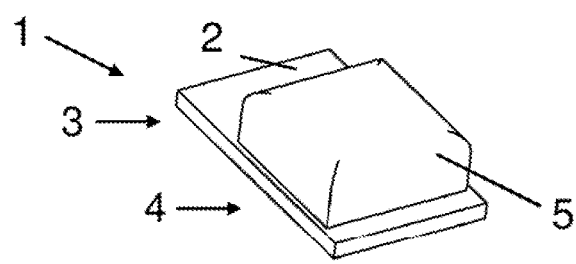
Fig. 1c
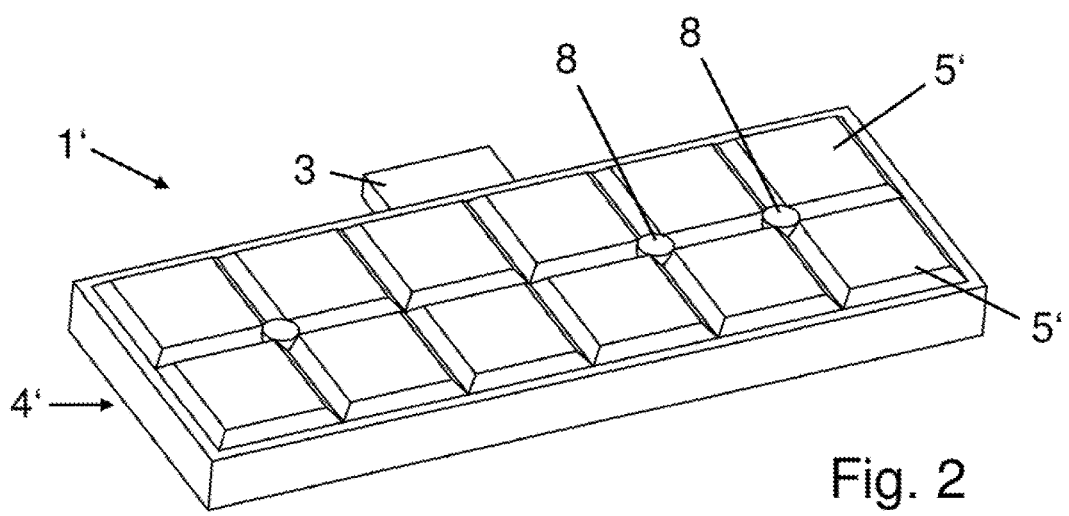
Fig. 2

DISPLAY DEVICE FOR A VEHICLE

FIELD OF THE INVENTION

The present application relates to a display device for a vehicle, such as, in particular, an aircraft, the device comprising a housing, a display screen adapted for displaying images and mounted in the housing, and at least one functional unit comprising an operating element, wherein each of the at least one functional unit is a switch unit, in which the operating element includes at least one actuation element and a switching circuit adapted to sense actuation of the at least one actuation element, or a communication unit, in which the operating element includes a communication device.

BACKGROUND OF THE INVENTION

In aircraft and other vehicles various display devices are provided for displaying images and information. Some of these devices also include input means for inputting information to the device. In the case of aircraft, for example, such devices may be utilized for various different purposes. For example, they may be flat panel screen devices provided as parts of the in-flight entertainment system for displaying movies and information to passengers, or flight attendant panels, which may comprise a touch screen as input means and which are mounted in the aircraft cabin such that they are accessible to the flight attendants. The flight attendants panels are adapted for displaying status information to the flight attendants and for allowing the flight attendants to enter control commands for controlling various on-board equipment, such as the flight entertainment system, the air conditioning system, the lighting system and the audio system.

Whether or not such display devices include a touch screen, they also necessarily comprise hardware switches, e.g. for actuation of important functions, such as an emergency function. They are typically disposed below the display screen of the display device, and may be provided as individual switches or as groups of switches, e.g. constituting a keypad or keyboard. In the case of touch screen devices, hardware switches, which may take the form of, for example, pushbuttons or keys, provide the advantage that they are also operable if the touch screen is no longer functional and can always be actuated without having to at first switch between different screens of a user interface implemented on the touch screen.

These hardware switches occupy a substantial space in the display device, so that their use and arrangement must be carefully chosen. Further, it may be desired to provide different hardware switches—or groups of hardware switches—for different applications, in order to customize the display device for a particular use scenario.

Similar considerations also apply to communication hardware enabling the display device to communicate via wired or wireless transmission paths.

In any case, this necessitates keeping available different hardware components and wiring selected ones of these to electrical circuitry inside the display device. In this connection it must also be taken into consideration that for some security relevant functions, such as, e.g., an emergency function, regulations require the corresponding electrical circuitry inside the display device being segregated in hardware from electrical circuitry associated with other functions, and that any change of constructive features of the display device may require new certification or testing. In particular, it may be required that each configuration of a display device must be tested separately and is assigned a separate part or certification number.

BRIEF SUMMARY OF THE INVENTION

An aspect of the present invention provides a display device for a vehicle which is adapted to simplify customization of the display device and to simplify the use of hardware switches and to reduce the space requirements of the hardware switches.

Accordingly, a display device for a vehicle, and in particular for an aircraft, comprises a housing, a display screen adapted for displaying images and mounted in the housing, and at least one functional unit comprising an operating element or portion. Each of the at least one functional unit is either a switch unit or a communication unit, i.e. instead of the term functional unit the term switch or communication unit could also be used.

For each functional unit being a switch unit the operating element or portion includes or is constituted by one or more actuation elements, such as keys or pushbuttons, and a switching circuit adapted to sense actuation of any of the actuation elements. Thus, upon actuation of one of the actuation elements, the respective actuation element cooperates with the switching circuit, e.g. by closing a portion of the switching circuit, such that electrical circuitry of the device connected to the switching circuit is able to recognize the actuation of the actuation element. For example, the switching circuit may be integrated into electrical circuitry of the display device in such a manner that actuation of the actuation element closes the respective electrical circuitry. In the alternative, it is also possible that the switching circuit is adapted to transmit, upon actuation of the actuation element, an actuation signal to a processor means provided in the housing and adapted for receiving and recognizing the actuation signal and effecting a switching action upon recognizing the actuation signal. According to this option, the switching circuit is adapted to transmit different actuation signals for different actuation elements, and different switch units or different types of switch units transmit different actuation signals.

For each functional unit being a communication unit the operating element or portion includes or is a wired or preferably wireless communication device.

Thus, depending on the type of functional unit, an operating element is a portion or section of a functional unit adapted to carry out or enable actuation of a switch function by a user or communication with an external device via a wired or wireless communication path.

Each of the at least one functional unit is adapted to be releasably coupled to the housing and comprises an insertion portion and an operating element support portion, wherein the operating element is provided and supported on—i.e. at or in—the operating element support portion. The insertion portion or both the insertion portion and the operating element support portion may be portions of a plate-shaped base element of the functional unit. In the latter case, like the entire base element the insertion portion is likewise plate-shaped and comprises two opposite extended surface, which constitute top and bottom surfaces, interconnected by smaller surfaces, which constitute side or edge surfaces.

Further, each of the at least one functional unit comprises a first contact arrangement provided on the insertion portion and electrically coupled to the operating element, preferably to the switching circuit in case of a switch unit and to the communication device in case of a communication unit.

The housing comprises at least one functional unit coupling arrangement. Each of these functional unit coupling arrangements is adapted to be selectively and releasably coupled to a selected one of the at least one functional unit and comprises a cavity inside the housing for selectively receiving and accommodating the insertion portion of any of the at least one functional unit, a second contact arrangement in the cavity, a retaining means, and an opening in an exterior wall of the housing communicating the cavity with the exterior of the housing.

For each of the functional unit coupling arrangements the opening and the cavity are sized and arranged in such a manner that for coupling a selected one of the at least one functional unit to the housing by means of the respective functional unit coupling arrangement, the insertion portion can be inserted through the opening into the cavity into a predetermined operating position, preferably along a predetermined insertion direction and—in case a plate-shaped base element is provided as described above—preferably via a movement in the plane defined by the plate-shaped base element. In this predetermined operating position the insertion portion is releasably retained by the retaining means such that the first contact arrangement is electrically connected to the second contact arrangement, i.e. the first and second contact arrangements are in contact with each other. In order to impede unauthorized removal of a functional unit the retaining means may cooperate with and engage a corresponding protrusion or depression provided on the insertion portion. Further, in the predetermined operating position the operating element support portion and the operating element are positioned exterior to the housing such that the operating element is accessible for a user. For example, for a switch unit the actuation element or actuation elements are accessible for actuation by a user. It is advantageous, if the opening of each functional unit coupling arrangement is arranged on a component side of a printed circuit board of the display device disposed inside the housing. Then, the second contact arrangement can be provided on the component side of the printed circuit board, which further reduces the space requirements.

It is to be noted that for each of the functional units the insertion portion is preferably configured for coupling with each of the functional unit coupling arrangements. However, e.g. due to space limitations and the dimensions of the operating element and/or the operating element support portion or due to specific requirements with respect to the construction of the first and second contact arrangements for particular functional units, it is possible that at least some of the functional units cannot be coupled to every functional unit coupling arrangement. Thus, it is for example possible that some functional unit coupling arrangements are adapted and suitable to receive switch units only, whereas other functional unit coupling arrangements are adapted and suitable to receive communication units only. Similarly, in the alternative or in combination it is also possible that some functional unit coupling arrangements are adapted and suitable to receive one or more particular types of switch units and/or one or more particular types of communication units only, whereas other functional unit coupling arrangements are adapted and suitable to receive one or more other particular types of switch units and/or one or more other particular types of communication units only.

The above construction provides the advantage that it is easily and flexibly possible with a significantly reduced installation effort and time to customize the display device with respect to hardware switches and communication functions. Further, the switch units and/or communication units can be tested and approved separately from the actual display device, so that the same switch units and communication units can be utilized with different display devices without having to carry out time-consuming testing upon installation in a specific display device. In this regard it is particularly advantageous that a display device of a particular type, which may, e.g., be a Design Assurance Level ("DAL") Level C device, can be tested and certified once and receive a particular part number, and that the same applies separately to each of the functional units, but that no separate testing or assignment of part numbers is necessary for the various different possible combinations of devices and functional units even in case the functional units have a different DAL classification, in particular a less security relevant. Moreover, the space requirements inside the housing are greatly reduced, and it is possible to construct the switch units such that they have low weight and height, in particular when utilizing a plate-shaped base element as described above. Similar considerations also apply to the communication units. This enables reducing the weight and the dimensions of the entire display device.

In a preferred embodiment, one, two or more of the at least one functional unit are a wireless communication unit, wherein the communication device is a wireless communication device and in particular a Near Field Communication ("NFC") communication device. Due to the fact that the wireless communication device is disposed outside the housing, Electromagnetic Interference ("EMU") problems inside the housing are avoided or diminished. Such a wireless communication unit may be adapted and utilized, for example, to contactlessly reading access cards or badges for identification or security purposes, i.e. a communication unit may be a card or badge reader.

In a preferred embodiment the display device comprises an exterior first surface forming a first side of the device, wherein the first surface is formed in part by a surface of the display screen, namely the surface on which images are visible, and in part by an exterior surface portion of the housing. The latter exterior portion preferably forms at least a part of the border of the first surface and side and, with respect to the intended mounting position of the display device, preferably constitutes at least a lower border of the first surface and side below the surface of the display screen. In the exterior surface portion of the first surface provided by the housing, and preferably at a location below the surface of the display screen with reference to the intended mounting position, at least one recess is provided in the exterior surface portion and comprises a wall or sidewall extending transversely and preferably perpendicularly with respect to the surface of the display screen.

In this embodiment, the opening of each of the at least one functional unit coupling arrangement is provided in the sidewall of one of the at least one recess, wherein upon coupling a selected one of the at least one functional unit to a selected one of the at least one functional unit coupling arrangement the respective operating element support portion—and preferably also the respective operating element—is located inside the respective recess. In this regard, a separate recess may be provided for each functional unit coupling arrangement, or one or more functional unit coupling arrangements may share a common recess. For example, it is also possible that a single recess is provided for all functional unit coupling arrangements.

Providing for such recess or recesses has the advantage that coupling and uncoupling of the functional units is possible in a simple manner and, in the coupled state, the operating element support portions—and preferably also the operating elements—are disposed inside a corresponding recess, thereby decreasing the overall height of the device and facilitating secure mounting of the switch units. Further, the insertion portion can be inserted in a simple manner through the respective opening in a direction transverse and preferably perpendicularly to the surface normal of the surface of the display screen.

In this embodiment it is further preferred if the display device further comprises at least one movable cover member for selectively covering at least one of the at least one recess. This cover member may be, e.g., pivotably coupled to the housing or may be selectively removable from the housing. It is movable between an opened position, in which a respective one or respective ones of the at least one recess is or are accessible and the at least one functional unit can be coupled to and uncoupled from the at least one functional unit coupling arrangement associated with the respective recess(es), and a closed position, in which the respective recess(es) is (are) covered such that coupling and uncoupling of the at least one functional unit to and from the respective functional unit coupling arrangement(s) is (are) prevented. Each such cover member may comprise at least one aperture, which is arranged in such a manner that in the closed position the operating element of each of the at least one functional unit coupled to one of the at least one functional unit coupling arrangement is accessible to a user through one of the at least one aperture. For example, in the case of a switch unit the actuation element or actuation elements are accessible for actuation by the user through one of the apertures even in the closed position of the respective cover member. However, it is also possible and may be preferred if the cover members or at least some of the cover members do not have apertures, in order to prevent access by a user to the operating elements of any functional unit coupled to a functional unit coupling arrangement associated with a recess covered by such cover member. In the latter case, the operating element support portion and the operating element of respective functional units—although positioned exterior to the housing—are only accessible for a user after opening or removing the respective cover member.

In any case, such cover member serves to avoid unauthorized removal of or tampering with any functional unit, such as a switch unit, coupled to the display device, and—when not being provided with an aperture—is able to prevent unauthorized use of a switch unit. In this regard, it is further preferred if the display device comprises a cover member securing means for securing the cover member or cover members in the closed position. The cover member securing means is adapted to release the cover member or cover members from the closed position, i.e. to unlock them, only upon receiving an electrical release signal. Such a release signal may be generated, for example, upon actuation of a suitable actuation means in the cockpit, by insertion of a chip card into a chip card reader which is part of the display device or connected as an external device to the display device, and/or by entering a code into a data entry means forming part of the display device or connected as an external device to the display device.

In a preferred embodiment the retaining means comprises a clamping means adapted for clampingly retaining the insertion portion in the predetermined position. For example, the clamping means may comprise one or more suitable spring elements. In this regard, it is to be noted that—also in case the retaining means does not comprise a clamping means—the cavity of each functional unit coupling arrangement may preferably comprise a shape corresponding to the insertion portion of the functional units, e.g. to the shape of a plate-shaped insertion portion if it is a part of a plate-shaped base element as described above. Thus, the cavity may be defined by a bottom wall, a top wall, sidewalls extending between the bottom and top walls, and, preferably, an end wall located opposite the opening. In the simplest case, clamping could be effected directly between the top and bottom walls which are then adapted to contact the opposite extended surfaces of the (plate-shaped) insertion portion. In that case, it is preferred for the cavity to taper in the direction away from the opening. Further, it is also possible that two or more of the functional unit coupling arrangements share the same cavity, wherein the retaining means is provided in the form of a separate bracket arrangement arranged in the cavity and adapted for receiving and holding the respective insertion portion.

In a preferred embodiment each of the at least one functional unit coupling arrangement further comprises a guide means defining a predetermined insertion direction and adapted to engage and guide the insertion portion upon movement through the opening into the predetermined position. This facilitates correct movement into the predetermined operating position. The guide means may comprise, e.g., rails adapted to engage the edges of the insertion portion and/or walls defining the cavity, such as the top, bottom and sidewalls mentioned above. It is also possible that the retaining means are part of the guide means.

In a preferred embodiment the opening of the at least one functional element coupling arrangement is slot-shaped, i.e. has a shape corresponding to the cross-sectional shape of the insertion portion which may preferably be plate-shaped, as described above.

In a preferred version of any embodiment, in which the display device comprises an exterior first surface forming a first side of the device with the first surface being formed in part by a surface of the display screen and in part by an exterior surface portion of the housing, it is further preferred if the insertion portion and/or the operating element support portion are at least in part constituted by a plate-shaped base element, and if the retaining means is arranged in such a manner that in the predetermined operating position the plane defined by the plate-shaped base element is oriented parallel to the surface of the display screen. In this manner it is easily possible to arrange the operating elements of the functional units and in particular the actuating elements of switch units near the border of the display screen surface, while at the same time being able to keep the height of the display device low.

In a preferred embodiment the insertion portion of each of the at least one functional unit has the shape of an insertion portion of a predetermined type of integrated circuit card, such as a memory card or chip card, and in particular of a standard Secure Digital ("SD") card. In this regard, it may also be advantageous if for at least one of the at least one functional unit the insertion portion and the operating element support portion are constituted by a plate-shaped base element, and wherein the plate-shaped base element has the shape of the predetermined type of integrated circuit card.

In the latter embodiment it is further preferred if the display device further comprises an integrated circuit or chip card reader adapted to receive and be releasably coupled to integrated circuit cards of the predetermined type, such as an SD card. Such integrated circuit card readers are often implemented in display devices for aircraft, such as flight attendant panels, in order to be able to flexibly program or provide data to the device. The integrated circuit card reader provides the or at least some of the functional unit coupling arrangements, which are also adapted for coupling with integrated circuit cards of the predetermined type. In other words, when choosing this configuration, the functional unit coupling arrangements or respective functional unit coupling arrangements are constructed to be identical to the slots of the integrated circuit card reader, thereby simplifying manufacture of the display device. In particular, the functional unit coupling arrangements are advantageously provided as an integral part of the integrated circuit card reader, in that each (respective) functional unit coupling arrangement also constitutes an integrated circuit card slot adapted for receiving an integrated circuit card of the predetermined type. In this manner, flexibility and ease of customization is increased even further, the available functional unit coupling arrangements can be used as desired and depending on the application to hold various different combinations of switch units, communication units and integrated circuit cards.

When using the latter embodiment, but also in other embodiments, at least two of the at least one functional unit are switch units adapted to effect different switching functions and/or at least two of the at least one functional unit are communication units adapted to effect different communication functions. It is then further preferred if each of the at least one functional unit comprises an identification means electrically coupled to the first contact arrangement and identifying the type of the respective functional unit or the respective functional unit as such. The device comprises a processor means electrically connected to each second contact arrangement of the at least one functional unit coupling arrangement. The processor means is adapted to receive, upon coupling a selected one of the at least one functional unit to one of the at least one functional unit coupling arrangement, an identification signal from the respective functional unit and to configure an operating function—such as a switching action in the case of a switch unit—to be effected by means of the respective operating element—such as upon actuation of the respective actuation element in the case of a switch unit—based on the received identification signal. In other words, depending on which functional unit is coupled to a functional unit coupling arrangement the processor means automatically configures the device such that, e.g., upon actuating an actuating element of a respective switch unit the appropriate switching function is effected. In case the functional unit coupling arrangements are also adapted to receive and retain integrated circuit cards, such as SD cards, it is further preferred if the processor means is also adapted to automatically recognize coupling of an integrated circuit card and to configure the respective functional unit coupling arrangement and associated circuitry for use with the integrated circuit card. The above automatic adaptation of the display device to different configurations further simplifies customization.

In a preferred embodiment, at least one of the at least one functional unit is a switch unit, and each actuation element and the switch circuit of each of these switch units are provided as a touch-sensitive membrane key or button, i.e. as a foil switch or button, like the button or key of a touch-sensitive membrane keyboard. Multiple actuation elements may constitute a touch-sensitive membrane keyboard. This construction allows for particularly low overall heights of the switch units.

In a preferred embodiment the display device is a flat-panel display device and/or a flight attendant panel. If the display device comprises an exterior first surface forming a first side of the device with the first surface being formed in part by a surface of the display screen and in part by an exterior surface portion of the housing, it is further preferred if the device comprises an exterior second surface forming a second side of the device opposite the first side, wherein the second surface is a portion of the housing and comprises an engagement portion extending in a plane and being arranged such that the device can be mounted to a planar wall of an aircraft with the engagement portion in contact with the wall.

The invention also provides a vehicle, and preferably an aircraft, comprising a display device having the above construction.

BRIEF DESCRIPTION OF THE DRAWINGS

In the following an exemplary embodiment of the display device will be explained in more detail with reference to the drawings.

FIGS. 1a, 1b and 1c show a switching unit according to an embodiment of the present invention in top plan view, in sectional side view and in a schematic perspective view, respectively, FIG. 2 shows a further switching unit according to an embodiment of the present invention.

DETAILED DESCRIPTION

Figure 3A:
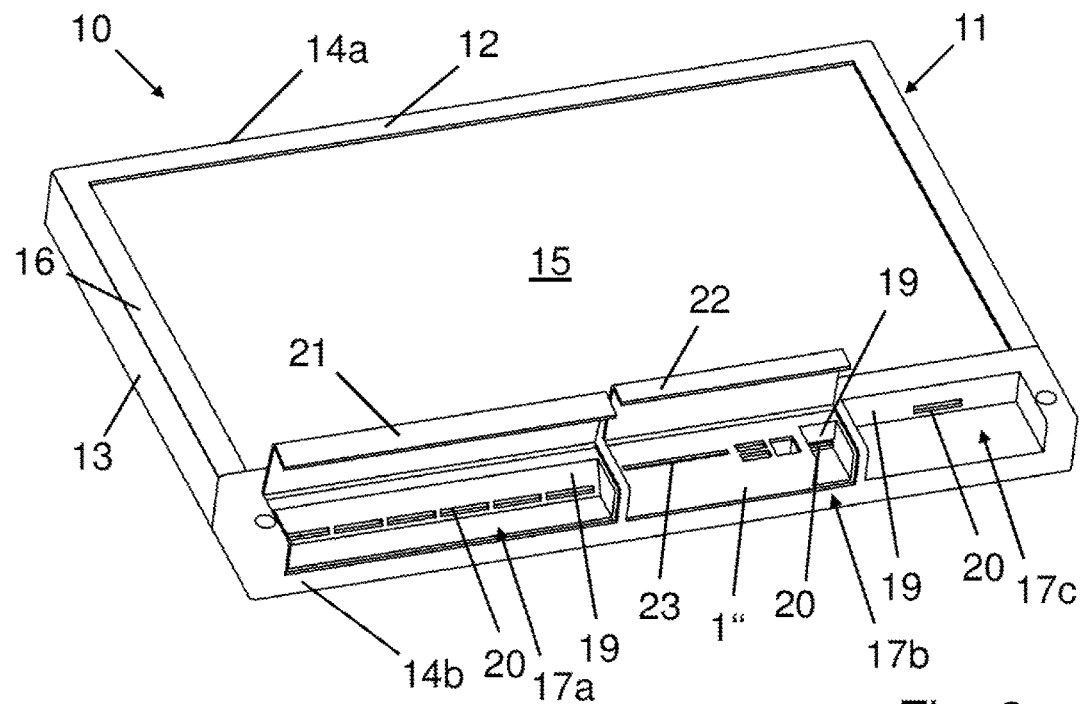
FIGS. 3a and 3b show a display device according to an embodiment of the present invention.

The switch unit 1 shown in FIG. 1a in plan view, in FIG. 1b in cross-section and in FIG. 1c in perspective view comprises a plate-shaped base element 2 having an insertion portion 3 and a switch element support portion 4, each of which are also plate-shaped. On one of the two opposing surfaces of the switch element support portion 4 a switch element 5 is supported, which is provided in the form of a foil or membrane switch together with an appropriate switching circuit adapted for sensing actuation of the switch element 5. On the insertion portion 3 a plurality of contacts 6 are provided, which are operably connected to the switching circuit of the membrane switch 5. The switching unit 1 also comprises two triangular projections 7 extending from lateral edges of the insertion portion 3. In FIG. 1c the contacts 6 and the projections 7 are not represented.

The different switch unit 1' shown in FIG. 2 in perspective view comprises an insertion portion 3 identical to the insertion portion 3 of the switch unit 1. The plate-shaped switch element support portion 4' supports twelve membrane switches 5' constituting a twelve key keyboard. Further, the switch unit 1' includes two Light Emitting Diodes ("LED"s)8, which are adapted and may be used to provide status indications.

Figure 3B:
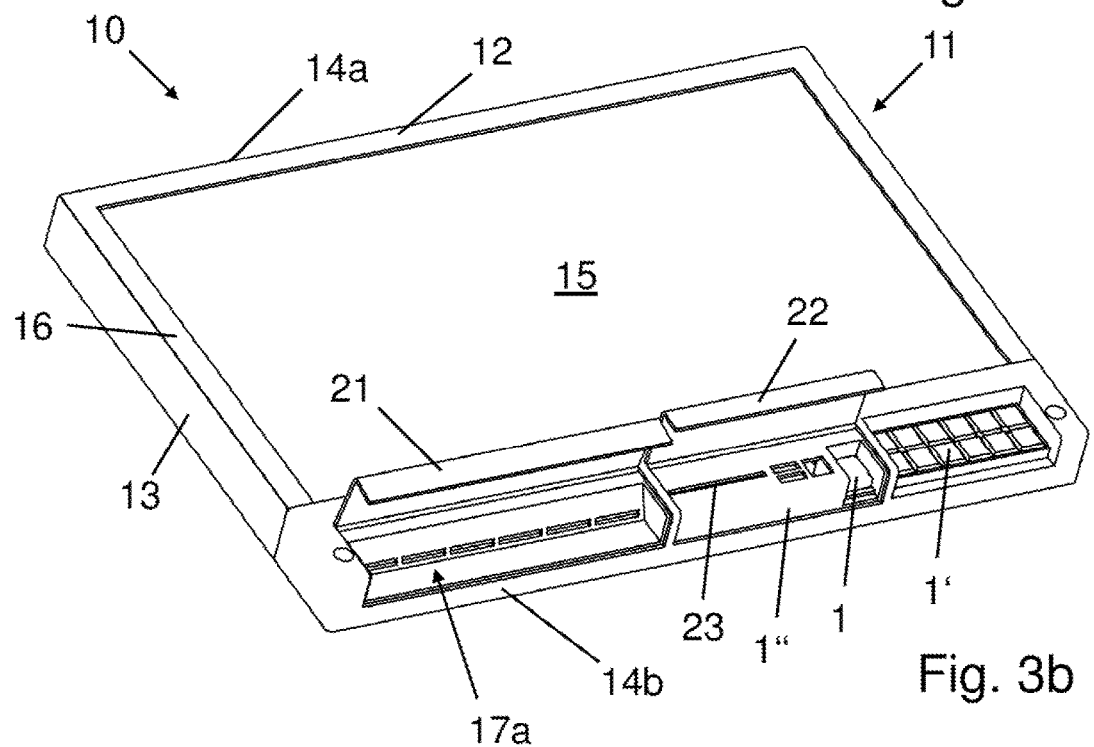

The display device 10 illustrated in FIG. 3a without the switch units 1 and 1' and in FIG. 3b when coupled to the switch units 1 and 1' is a flat-panel flight attendant panel. It comprises a housing 11 and has an extended front surface 12, an extended opposite back surface, two opposite lateral edge surfaces (one of which is indicated at 13) and upper and lower edge surfaces 14a, 14b. In the housing a touch screen display means is mounted having a display surface 15, which forms part of the front surface 12 of the display device 10. The display surface 15 is surrounded by a border 16 formed by the housing 11, wherein the portion of the border 16 below the display surface 15 is larger than the remaining portions.

In the portion of the border 16 below the display surface 15 three recesses 17a, 17b and 17c are formed. Each of the recesses 17a, 17b and 17c has a sidewall 19 extending perpendicularly relative to the display surface 15, and one or more slots 20 are formed in the sidewalls 19. The slots 20 are sized such that the insertion portion 3 of the switch units 1 and 1' of FIGS. 1a, 1b and 1c can be selectively inserted, with its end at which the contacts 6 are located facing forwards, into and through each of the slots 20 until a predetermined operating position is reached, in which, as illustrated in FIG. 3b, the respective switch element support portion 4, 4' together with the actuation element 5 or actuation elements 5' is disposed outside the housing entirely inside the recess 17b and 17c, respectively.

Inside the housing 10 a separate cavity is provided for and in communication with each of the slots 20. Each such cavity comprises a contact arrangement which, upon insertion of the switch unit 1, 1' into the respective slot 20 into the predetermined operating position, is in contact with the plurality of contacts 6 of the switch unit 1, 1', such that actuation of the switch element 5 or switch elements 5' can be sensed by suitable circuitry of the display device 1. Each of the cavities also includes a retaining arrangement adapted to retain the switch unit 1 in the predetermined operating position. The retaining arrangement includes depressions into which the projections 7 engage, and a release mechanism which may be actuated in order to disengage the projections 7 from the depressions.

For each of the recesses 17a and 17b a cover 21, 22 is provided, which is pivotably coupled to the housing 11 and can be moved between an opened position shown in FIGS. 3a and 3b into a closed position (not shown). In the closed position the covers 21, 22 cover and close the recesses 17a, 17b preventing removal of the switch unit 1. In order to allow access to the actuation element 5 and actuation of the switch unit 1 even in the closed position of the covers 21, 22, the covers may 21, 22 comprise suitable apertures, if desired.

The slots 20 may preferably also serve for receiving SD cards. In this regard it is possible that only some of the slots 20, such as the slots 20 in the recesses 17b and 17c, are adapted for receiving the switch units 1 and 1', respectively, whereas the remaining slots 20, such as the slots 20 in the recess 17a, are adapted for receiving SD cards. However, it is preferred if all slots 20 are adapted for receiving both SD cards and at least one of the switch units 1, 1'.

In the embodiment illustrated in FIGS. 3a and 3b a communication unit 1", which is constructed similar to the switch units 1, 1' in that it comprises an insertion portion identical to the insertion portion 3 of the switch units 1, 1' and a communication device supported on a communication device support portion, is disposed inside the recess 17b. As in the case of the switch units 1, 1', its insertion portion has been inserted through a slot 20 located in the recess 17b, and its communication device support portion and communication device is located exterior to the housing inside the recess 17b. In this regard, the communication unit 1" includes an own recess for accommodating the switch unit 1, and the slot 20 receiving the insertion portion of the switch unit 1 is accessible through a corresponding slot provided in the communication unit 1".

The communication unit 1" comprises a slot 23 for insertion of an access card or badge and is adapted to read data on the access card or badge for identification purposes. Further, the communication device is an NFC communication device adapted for contactlessly reading such access cards or badges for identification purposes.

The invention claimed is:

1. A display device for a vehicle, the device comprising
a housing,
a display screen adapted for displaying images and mounted in the housing, and
at least one functional unit comprising an operating element,
wherein each of the at least one functional unit is:
a switch unit, in which the operating element includes at least one actuation element and a switching circuit adapted to sense actuation of the at least one actuation element, or
a communication unit, in which the operating element includes a communication device,
wherein each of the at least one functional unit is adapted to be releasably coupled to the housing and comprises:
an insertion portion and an operating element support portion, wherein the operating element is provided and supported on the operating element support portion, and
a first contact arrangement provided on the insertion portion and electrically coupled to the operating element, and
wherein the housing comprises at least one functional unit coupling arrangement, each adapted to be selectively and to be releasably coupled to at least one of the at least one functional unit and comprising:
a cavity inside the housing for receiving the insertion portion of the at least one functional unit,
a second contact arrangement in the cavity,
a retaining means, and
an opening in an exterior wall of the housing communicating the cavity with the exterior of the housing,
wherein the opening and the cavity are sized and arranged in such a manner that for coupling one of the at least one functional unit to the housing the respective insertion portion can be inserted through the opening into the cavity into a predetermined operating position in which the insertion portion is releasably retained by the retaining means such that the first contact arrangement is electrically connected to the second contact arrangement, and in which the operating element support portion and the operating element are positioned exterior to the housing such that the operating element is accessible for a user.

2. The display device according to claim 1, wherein at least one of the at least one functional unit is a wireless communication unit, wherein the communication device is a Near Field Communication (NFC) communication device.

3. The display device according to claim 1, comprising an exterior first surface forming a first side of the device,
wherein the first surface is formed in part by a surface of the display screen and in part by an exterior surface portion of the housing,
wherein at least one recess is provided in the exterior surface portion and comprises a sidewall extending transversely with respect to the surface of the display screen, and
wherein the opening of each of the at least one functional unit coupling arrangement is provided in the sidewall of one of the at least one recess, wherein upon coupling a selected one of the at least one functional unit to a selected one of the at least one functional unit coupling arrangement the respective operating element support portion is located inside the respective recess.

4. The display device according to claim 3, further comprising at least one movable cover member for selectively covering the at least one recess, wherein the at least one movable cover member is movable between an opened position, in which the at least one recess is accessible and the at least one functional unit can be coupled to and uncoupled from the at least one functional unit coupling arrangement, and a closed position, in which the at least one recess is covered such that coupling and uncoupling of the at least one functional unit to and from the at least one functional unit coupling arrangement is prevented.

5. The display device according to claim 1, wherein each of the at least one functional unit coupling arrangement further comprises a guide means defining a predetermined insertion direction and adapted to engage and guide the insertion portion upon movement through the opening into the predetermined position.

6. The display device according to claim 1, wherein the opening of the at least one functional unit coupling arrangement is slot-shaped.

7. The display device according to claim 1, wherein the insertion portion and/or the operating element support portion are at least in part constituted by a plate-shaped base element, and wherein the retaining means is arranged in such a manner that in the predetermined position the plane defined by the plate-shaped base element is oriented parallel to the surface of the display screen.

8. The display device according to claim 1, wherein for each of the at least one functional unit the insertion portion has the shape of a portion of a predetermined type of integrated circuit card.

9. The display device according to claim 8, wherein for at least one of the at least one functional unit the insertion portion and the operating element support portion are constituted by a plate-shaped base element, and wherein the plate-shaped base element has the shape of the predetermined type of integrated circuit card.

10. The display device according to claim 8, further comprising an integrated circuit card reader adapted to receive and be releasably coupled to integrated circuit cards of the predetermined type, wherein the integrated circuit card reader provides the functional unit coupling arrangements, which are also adapted for coupling with integrated circuit cards of the predetermined type.

11. The display device according to claim 1, wherein at least two of the at least one functional unit are switch units adapted to effect different switch functions and/or at least two of the at least one functional unit are communication units adapted to effect different communication functions.

12. The display device according to claim 11, wherein
each of the at least one functional unit comprises an identification means electrically coupled to the first contact arrangement and identifying at least the type of the respective functional unit, and
the device comprises a processor means electrically connected to the second contact arrangement of the at least one functional unit coupling arrangement, wherein the processor means is adapted to receive, upon coupling a selected one of the at least one functional unit to one of the at least one functional unit coupling arrangement, an identification signal from the respective functional unit and to configure an operating function to be effected by means of the respective operating element based on the received identification signal.

13. The display device according to claim 1, wherein at least one of the at least one functional unit is a switch unit, the at least one actuation element and the switch circuit of which are provided as a touch-sensitive membrane button or keyboard.

14. The display device according to claim 1, wherein the display device is a flat-panel display device and/or a flight attendant panel.

15. An aircraft comprising a display device comprising:
a housing,
a display screen adapted for displaying images and mounted in the housing, and
at least one functional unit comprising an operating element,
wherein each of the at least one functional unit is:
a switch unit, in which the operating element includes at least one actuation element and a switching circuit adapted to sense actuation of the at least one actuation element, or
a communication unit, in which the operating element includes a communication device,
wherein each of the at least one functional unit is adapted to be releasably coupled to the housing and comprises:
an insertion portion and an operating element support portion, wherein the operating element is provided and supported on the operating element support portion, and
a first contact arrangement provided on the insertion portion and electrically coupled to the operating element, and
wherein the housing comprises at least one functional unit coupling arrangement, each adapted to be selectively and to be releasably coupled to at least one of the at least one functional unit and comprising:
a cavity inside the housing for receiving the insertion portion of the at least one functional unit,
a second contact arrangement in the cavity,
a retaining means, and
an opening in an exterior wall of the housing communicating the cavity with the exterior of the housing,
wherein the opening and the cavity are sized and arranged in such a manner that for coupling one of the at least one functional unit to the housing the respective insertion portion can be inserted through the opening into the cavity into a predetermined operating position in which the insertion portion is releasably retained by the retaining means such that the first contact arrangement is electrically connected to the second contact arrangement, and in which the operating element support portion and the operating element are positioned exterior to the housing such that the operating element is accessible for a user.

* * * * *